(12) United States Patent
Blanchard et al.

(10) Patent No.: US 8,863,171 B2
(45) Date of Patent: Oct. 14, 2014

(54) ANNOUNCEMENT OF PROGRAM SYNCHRONIZED TRIGGERED DECLARATIVE OBJECTS

(75) Inventors: Robert Blanchard, Escondido, CA (US); Mark Kenneth Eyer, Woodinville, WA (US)

(73) Assignee: Sony Corporation, Tokyo (JP)

( * ) Notice: Subject to any disclaimer, the term of this patent is extended or adjusted under 35 U.S.C. 154(b) by 361 days.

(21) Appl. No.: 12/959,529

(22) Filed: Dec. 3, 2010

(65) Prior Publication Data

US 2011/0307920 A1    Dec. 15, 2011

Related U.S. Application Data

(60) Provisional application No. 61/354,476, filed on Jun. 14, 2010.

(51) Int. Cl.
| H04N 7/10 | (2006.01) |
| H04N 7/025 | (2006.01) |
| H04N 21/643 | (2011.01) |
| H04N 21/443 | (2011.01) |
| H04N 21/81 | (2011.01) |

(52) U.S. Cl.
CPC ..... *H04N 21/4431* (2013.01); *H04N 21/64322* (2013.01); *H04N 21/8173* (2013.01)
USPC .......................................................... 725/32

(58) Field of Classification Search
None
See application file for complete search history.

(56) References Cited

U.S. PATENT DOCUMENTS

| 6,182,277 B1 | 1/2001 | DeGroot et al. |
| 2001/0001160 A1* | 5/2001 | Shoff et al. ..................... 725/51 |
| 2003/0018971 A1* | 1/2003 | McKenna, Jr. .................. 725/40 |
| 2005/0091269 A1 | 4/2005 | Gerber et al. |
| 2005/0148296 A1 | 7/2005 | Kopra et al. |
| 2005/0166257 A1* | 7/2005 | Feinleib et al. ............... 725/136 |
| 2007/0079353 A1 | 4/2007 | Boortz |
| 2008/0010653 A1 | 1/2008 | Ollikainen et al. |
| 2008/0082922 A1 | 4/2008 | Biniak et al. |
| 2009/0327894 A1* | 12/2009 | Rakib et al. ................... 715/719 |
| 2010/0042692 A1 | 2/2010 | Irwin et al. |

FOREIGN PATENT DOCUMENTS

WO    WO 2009/057050    5/2009

OTHER PUBLICATIONS

International Search Report and Written Opinion, corresponding PCT application No. PCT/US2011/040347, dated Oct. 3, 2011.
Albrecht, "TV Multitaskers Can Get Jacked," The GigaOM Network, Mar. 15, 2008.
Anonymous, "Verizon Launches New Wave of Interactive Features for FiOS TV Customers in North Texas," Verizon News Release, Oct. 24, 2008.
Anonymous, "Verizon Ushers in a New Era of Television Entertainment With the Debut of FiOS TV in Allentown, PA." PR Newswire, Nov. 4, 2009.

* cited by examiner

*Primary Examiner* — Nathan Flynn
*Assistant Examiner* — Omar S Parra
(74) *Attorney, Agent, or Firm* — Oblon, Spivak, McClelland, Maier & Neustadt, L.L.P.

(57) ABSTRACT

A method consistent with certain implementations involves delivering a triggered declarative object (TDO) to a television receiver device that carries out a programmed routine when user activated and includes an announcement definition that announces presence of the TDO to the at the announcement time; and the TDO including data that defines a time of display of an announcement and a location on a video display for display of the announcement of the TDO. This abstract is not to be considered limiting, since other embodiments may deviate from the features described in this abstract.

20 Claims, 3 Drawing Sheets

ANNOUNCEMENT OF PROGRAM SYNCHRONIZED TRIGGERED DECLARATIVE OBJECTS

CROSS REFERENCE TO RELATED DOCUMENTS

This application claims priority benefit of U.S. Provisional Patent Application Ser. No. 61/354,476 titled "METHOD TO ANNOUNCE PROGRAM-SYNCHRONIZED WIDGETS," which was filed in the United States Patent Office on Jun. 14, 2010, and which is incorporated herein by reference.

COPYRIGHT NOTICE

A portion of the disclosure of this patent document contains material which is subject to copyright protection. The copyright owner has no objection to the facsimile reproduction of the patent document or the patent disclosure, as it appears in the Patent and Trademark Office patent file or records, but otherwise reserves all copyright rights whatsoever.

BACKGROUND

Widgets such as those or modeled after the concept developed by Intel and Yahoo! are software products that can be retrieved in an Internet Protocol (IP) enabled television in order to provide various information to the user. Those products are generally configurable by the user to display information of interest and can be located at various locations on the television display.

The Yahoo!/Intel TV Widget concept was announced at CES 2009. The widget functions envisioned were general purpose functions such as stock quotes, weather, photo viewing, news and info, and the like.

BRIEF DESCRIPTION OF THE DRAWINGS

Certain illustrative embodiments illustrating organization and method of operation, together with objects and advantages may be best understood by reference detailed description that follows taken in conjunction with the accompanying drawings in which.

DETAILED DESCRIPTION

Figure 1:
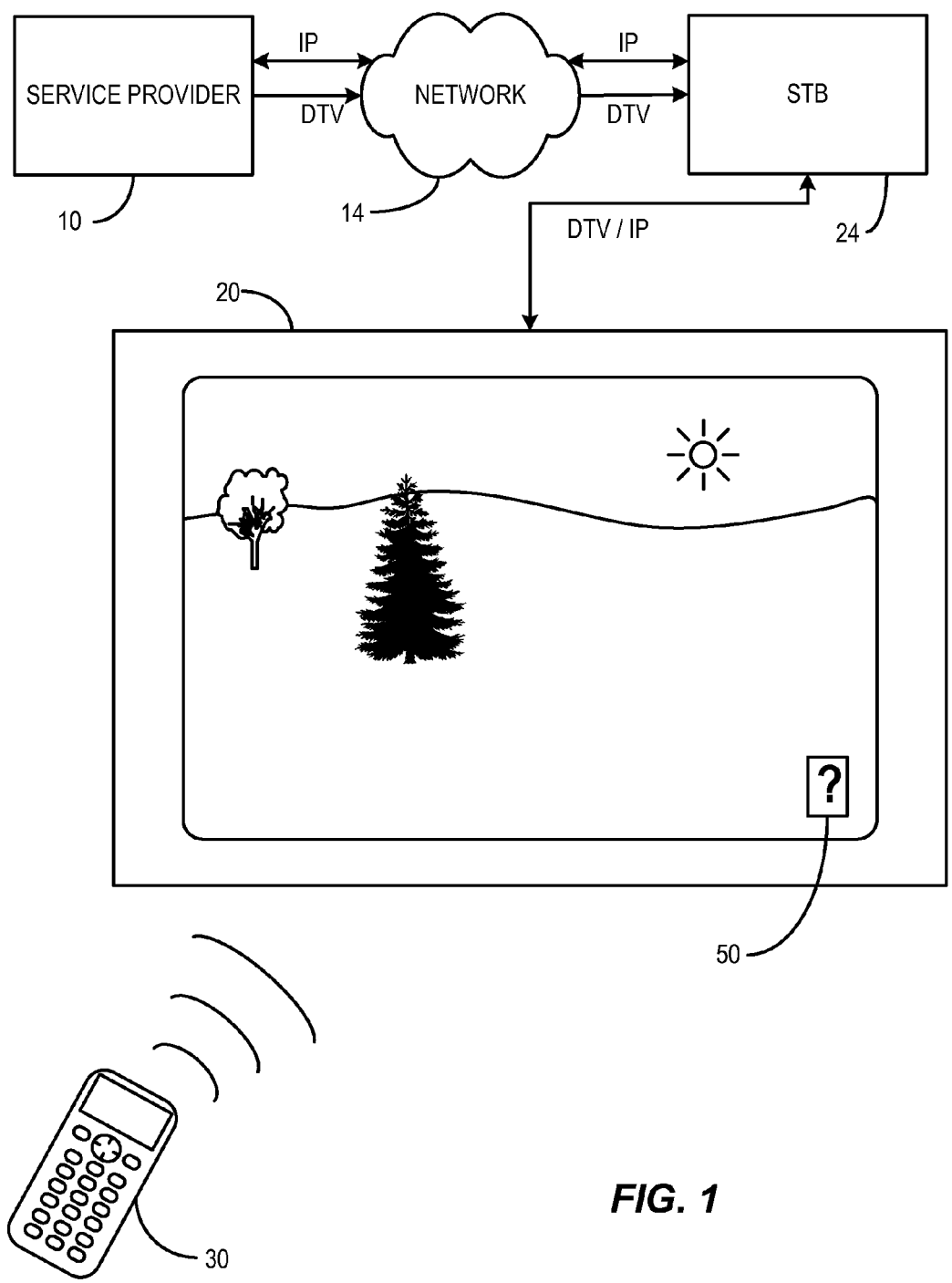
FIG. 1 is an example system that uses Triggered Declarative Objects (TDOs) in a manner consistent with certain embodiments of the present invention.

While this invention is susceptible of embodiment in many different forms, there is shown in the drawings and will herein be described in detail specific embodiments, with the understanding that the present disclosure of such embodiments is to be considered as an example of the principles and not intended to limit the invention to the specific embodiments shown and described. In the description below, like reference numerals are used to describe the same, similar or corresponding parts in the several views of the drawings.

The terms "a" or "an", as used herein, are defined as one or more than one. The term "plurality", as used herein, is defined as two or more than two. The term "another", as used herein, is defined as at least a second or more. The terms "including" and/or "having", as used herein, are defined as comprising (i.e., open language). The term "coupled", as used herein, is defined as connected, although not necessarily directly, and not necessarily mechanically. The term "program" or "computer program" or similar terms, as used herein, is defined as a sequence of instructions designed for execution on a computer system. A "program", or "computer program", may include a subroutine, a function, a procedure, an object method, an object implementation, in an executable application, an applet, a servlet, a source code, an object code, a shared library/dynamic load library and/or other sequence of instructions designed for execution on a computer system.

The term "program", as used herein, may also be used in a second context (the above definition being for the first context). In the second context, the term is used in the sense of a "television program". In this context, the term is used to mean any coherent sequence of audio video content such as those which would be interpreted as and reported in an electronic program guide (EPG) as a single television program, without regard for whether the content is a movie, sporting event, segment of a multi-part series, news broadcast, etc. The term may also be interpreted to encompass commercial spots and other program-like content which may not be reported as a program in an electronic program guide.

Reference throughout this document to "one embodiment", "certain embodiments", "an embodiment" or similar terms means that a particular feature, structure, or characteristic described in connection with the embodiment is included in at least one embodiment of the present invention. Thus, the appearances of such phrases or in various places throughout this specification are not necessarily all referring to the same embodiment. Furthermore, the particular features, structures, or characteristics may be combined in any suitable manner in one or more embodiments without limitation.

The term "or" as used herein is to be interpreted as an inclusive or meaning any one or any combination. Therefore, "A, B or C" means "any of the following: A; B; C; A and B; A and C; B and C; A, B and C". An exception to this definition will occur only when a combination of elements, functions, steps or acts are in some way inherently mutually exclusive.

As used herein, the term Triggered Declarative Object (TDO) is a downloadable software object created by a content creator or service provider. Generally, such objects have declarative content (text, graphics, scripts, and audio) whose function and behavior is tied in some way to the television programming that it accompanies. The TDO, in examples shown herein, are pushed from a service provider in advance of a time defined by a trigger object or multiple trigger objects (as explained below) so that the TDO is available when the trigger arrives. Various standards bodies may define associated available behaviors, appearance, trigger actions, and transport methods for content and metadata for a TDO. Additionally, requirements regarding timing accuracy of TDO behaviors relative to audio/video may be defined by standards bodies.

As used herein a "trigger" or "announcement trigger" is a data object, bound to a particular program segment, that references the location where a TDO may be acquired, such as a file name or identifier for a file that has already been downloaded via non-real-time (NRT) services. Requirements regarding timing accuracy of triggers relative to audio/video may also eventually be dictated by standards bodies. Certain TDOs will only make sense in conjunction with a certain program. An example is a TDO that collects viewer response data, such as voting on a game show or contest.

The following examples illustrate several of the many potential uses for TDOs:

Personalized Stock Portfolio Display using Available Screen Real Estate

In this example, the user initializes this TDO with a list of the stocks of interest (those that should be displayed when the TDO is running) If the user chooses to activate the "My Portfolio" TDO, it displays itself in an area of the screen designated by the service provider as "available screen real estate." The TDO responds appropriately by hiding itself if the screen space becomes unavailable (for example, due to an advertisement or other scene change). This example makes clear that the signaling inserted by the broadcaster, that supports the TDO, involves synchronization both as to timing (to accommodate advertising segments) as well as spatially (to adjust to a variety of screen layouts of the broadcast programming)

Car Race TDO Example

TDOs can be used to enhance the experience of watching a televised car race. An example user scenario follows: When an ATSC 2.0-capable DTV receiver to the NASCAR race, the user discovers that an interactive feature is available. He activates the "Favorite Driver Watch" TDO, which offers him a choice of which driver to monitor. He chooses his favorite. The TDO then shrinks in size to occupy a small portion of the screen, and displays a thumbnail photo of the driver, his current speed, RPM, and position in the race. The TDO can be programmed to disappear during advertising spots and whenever racing is suspended or complete.

Voting TDO

Some programs involve viewer participation in the form of voting for favorite performers or other types of viewer feedback. A TDO can be used to capture the same kind of viewer input that a telephone call to a particular number can register. A TDO could be activated in this case to deliver a viewer's vote for his favorite performer. Where user choices are involved, especially in the case of multiple choices, methods of associating particular buttons on a remote control with matching shapes and/or colors in on-screen instructions have proved helpful in other consumer contexts and may be of benefit in enhancing the interactive user experience.

Baseball Game TDO

A user setup mode would allow the viewer to choose a favorite player or team to monitor. The TDO can then provide updated statistics and other information. The TDO may be associated with a particular broadcast of a baseball game.

Pizza Delivery TDO

By way of a further example, consider a sporting event that is televised and sponsored by a pizza delivery company. The TDO can be a program that permits the user to order a pizza via his or her television set. The TDO can be pre-delivered and whenever the pizza delivery company has a commercial, a trigger announcement can be presented to the viewer. By way of example, consider an announcement of rotating large text that says "CLICK ENTER TO ORDER A PIZZA NOW!". The user can then select <ENTER> from the remote control and enable the TDO which collects the user's address (either from pre-stored information) or by entry of the user's telephone number or other identifier. A menu can then be presented that permits selection of a type of pizza, quantity and other relevant information. The user can then place the order and possibly even pay for the order online using the TDO.

These examples and others presented above are but a few of the possibilities that can capitalize on the time association of the TDO with programming or commercial content. Upon consideration of these teachings, those skilled in the art will appreciate that many variations are possible and that the TDOs can be programmed to provide a variety of timely information, products and services to the user. Generally speaking, a TDO can carry out any function that one can implement by software programming that can run on a television receiver device processor platform—present or future.

In most cases a user interacts with the receiver initially to launch or activate one or more TDOs that may accompany a given program. One could envision a receiver implementation in which any TDO that has been downloaded is immediately launched as soon as the timing is right within the program. Users, however, probably would find this intrusive. Therefore, a more subtle method is needed that will notify the user that an enhanced (interactive) experience is being offered. A graphical icon or other visual indicator (e.g., an animation) can be displayed in a corner of the screen, for example, to indicate the availability of a TDO offering interactivity. The user may then push a button on the remote control to launch the TDO.

In accord with the present subject matter, triggers carrying specific metadata allow a TDO to signal to the user of an Internet-connected TV that interactive content synchronized to the current programming can be enabled for interaction. The receiver may respond by creating an on-screen display based on the metadata as an "announcement indicator." If the user enables display of such announcements, then text and/or graphics (stationary or moving, possibly accompanied by audio) can be displayed notifying the user that a TDO is available for interaction. If the user cares to interact with the TDO, then the TDO is launched and enabled for user interaction upon user command.

This concept gives broadcasters some control over the way TDOs are announced. The icon or graphic associated with one broadcaster's TDOs may be unique and easily identifiable to the viewer, as compared with similar announcements associated with a different broadcaster's programs. Announcements are done in a manner that does not interrupt the viewing experience in any significant way. The present subject matter provides a method for the content creator to control the way a TDO announces its availability. The user retains the option to decide whether or not to allow any announcement of available TDOs and also whether or not to interact with each available TDO.

In certain implementations consistent with the present embodiments, the definition of the synchronized TDO includes a definition for its behavior prior to being activated, e.g. when the trigger indicates that the timing is appropriate for it to be activated. Prior to being activated, the TDO may announce itself as a small graphical icon or other announcement. The user knows that when such icons or announcements are on-screen, pushing an appropriate button on the remote will launch the TDO. The TDO trigger's metadata describes the characteristics and behavior of the TDO and the time period it is available. The pre-launch appearance may be a textual message such as "to Interact with this program hit <ENTER>," or it may be a static or animated icon or graphic, or some combination of the two.

While widget functions were envisioned as general purpose functions such as stock quotes, weather, photo viewing, news and info, and the like, TDOs take the concept farther by virtue of their being associated with television program content. Metadata sent along with the audio/video of the program determines the behavior and functionality of the TDO. The concept of a synchronized trigger (or multiple triggers for a single TDO) enables user interaction during a program. In the alternative, a TDO may be self triggering and may hence not require a separate trigger object.

In the above polling example, a program provider conventionally displays a screen that states, "To vote, please text or call" and a telephone number. Rather than doing this, the trigger may be used to announce that a TDO can be enabled to provide the polling interaction, without requiring the program to cut away to a screen as described above. The user reads the text or graphics derived from the trigger metadata and decides whether or not to launch the TDO. If the TDO is launched, the trigger data is used to determine the screen location the TDO (as designed by the programmer), which can be displayed without interrupting or blocking the scene. The TDO may also have the capability of recording the polling data and reporting back through an Internet connection if available. If an Internet connection is not available, the TDO may announce how to do the polling in an alternate method. In addition to TV, this concept can be applied to mobile phones, as well as cable, satellite, and IPTV services.

Turning now to FIG. 1, an example implementation of a system utilizing TDOs in a manner consistent with the present embodiment is depicted with a service provider 10 supplying television content over a network 14 (wired or wireless) such as a cable television network, Internet, broadcast or satellite network. The content may be delivered directly to a TV set 20, or may be delivered via a set top box (STB) decoder terminal 24. The television (and STB) may be controlled using a remote controller device such as 30. The service provider 10 may be a multiple service operator (MSO) as shown that provides both digital television (DTV) program signals as well as Internet services in certain implementations.

In this example illustration, the service provider 10 pre-delivers the TDO to the television set 20 using non-real time (NRT) services in advance of when the TDO will be announced and in advance of when it will be launched. This can be accomplished using the DTV signal by use of an Internet connection to the television. The TDO is then initialized if any initialization is needed and resides in storage of the television 20 (or alternatively in the STB) until it is announced. The TDO may be self triggered so that it launches at a specified time or may be triggered later by a trigger object as will be described.

The TDO, as noted above, is a software program that can carry out a designated function associated with either the TV program being watched, a particular time of day, a television commercial, or other association. Once downloaded to the television 20, the TDO waits until a trigger signal combined with a user action activates the TDO.

In this figure, the presence of a TDO is announced at an appropriate time during programming. This announcement can take many forms including the simple icon 50 shown as a box enclosing a question mark. However, the announcement is defined by a software routine forming a part of the trigger signal or more preferably programmed into the logic of the TDO itself. The announcement can, therefore, be anything that the programmer envisions including any combination of still or animated icons, audio, text images, graphics or other announcements. The user can then activate the associated TDO by executing an appropriate command from the remote controller 30. Upon the TV's receipt of the appropriate command, the TDO is launched.

In general, the trigger object supplies the timing and screen location for the announcement in the preferred implementation, and the TDO itself defines what to do when triggered. Sometimes a small amount of data in the trigger object may be involved. For example, in case of display screen real estate, the trigger may also include data (such as the coordinates of the available screen real estate) that is used to determine the location that an announcement defined by the TDO is to be placed. The TDO itself preferably contains the announcement definition because the TDO preferably defines everything to do with its own appearance and behavior. Of course, in other implementations, the trigger object can also contain to have other data.

The trigger signal includes data that may define any of the following attributes associated with the TDO:
  A TDO identifier or other mechanism for linking a trigger object with its associated TDO;
  Screen location for at least a portion of the TDO;
  Time that the TDO expires (or time window or windows in which the TDO can be activated);
  An instruction to start, end or suspend a TDO operation;
  Announcement definition (e.g., code or data that generates an icon or generates an animation—but this is preferably defined in the TDO);
  Script for generation of announcement, graphics or text— but this is also preferably defined in the TDO;
  Screen location for the Announcement;
  At least one time at which the announcement is to be presented to the viewer—such time may be the time of receipt of the trigger or may be a defined time in the future;
  Other attributes of TDO or trigger announcement;

Alternatively, the TDO itself may include all aspects of operation that are not timing dependent, such as the script for generation of announcement, graphics or text, the code that defines the announcement, and the default screen location where the TDO and announcements are to appear.

Figure 2:
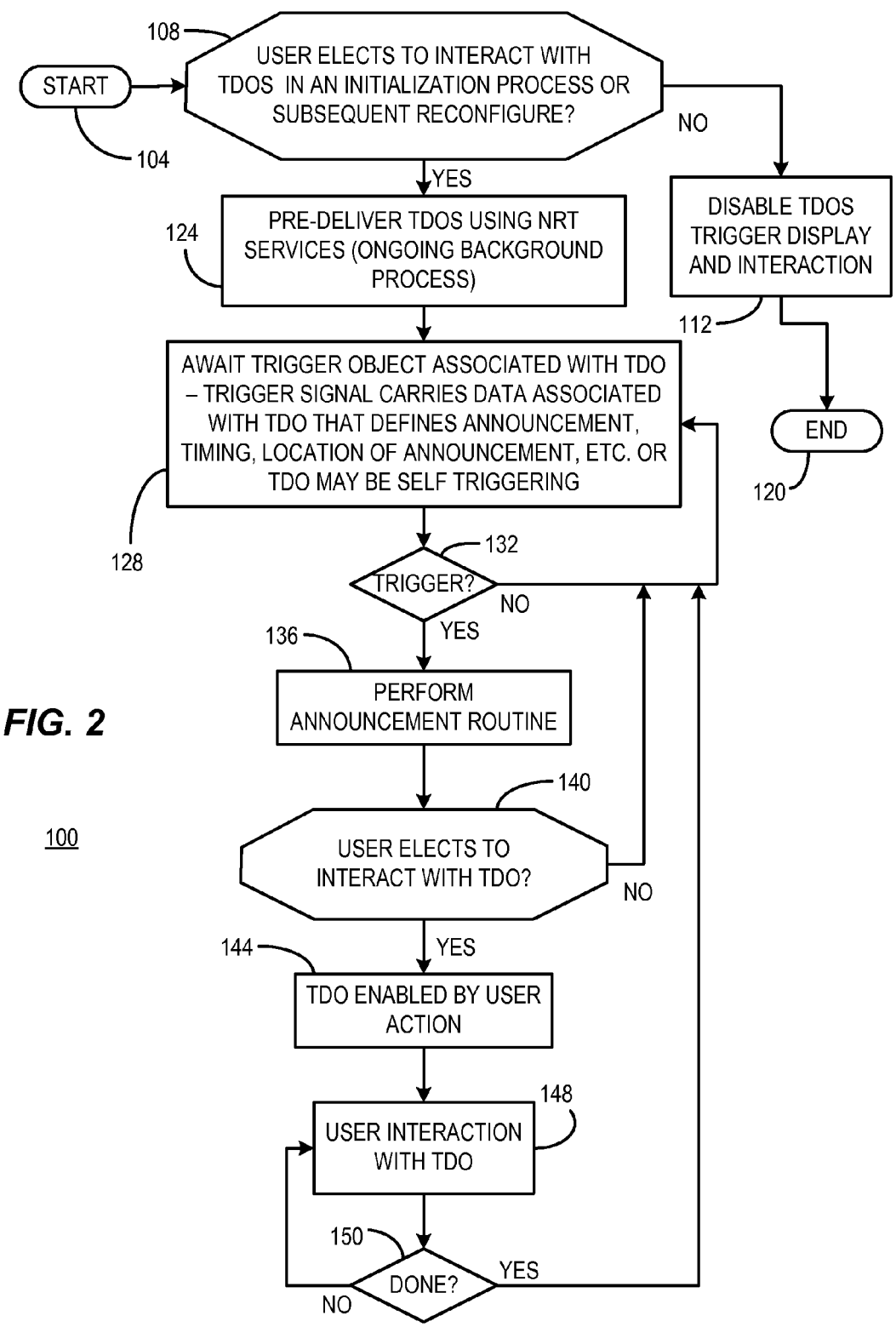
FIG. 2 is an example flow chart of a process of an implementation of using TDOs in a manner consistent with certain embodiments of the present invention.

Referring now to FIG. 2, an example process 100 is depicted starting at 104 in which an initialization phase or configuration phase or reconfiguration phase is entered. In this phase, at 108, the user can determine if he or she wishes to interact with TDOs, since some users may consider TDOs to be a disruption of their program viewing experience or otherwise may not wish to interact with TDOs. If the user opts out of using TDOs at 108, the TDO function and trigger functions of the television may be disabled at 112. This results in appropriate flags or other indicators being set so that receipt of TDOs is ignored and/or announcement triggers are ignored. The initialization phase or configuration phase is exited at 120.

However, if the viewer wishes to utilize the TDO functionality of their television set (or other television receiver device), the process sets appropriate flags or other markers indicating the user preference and proceeds to 124 where an ongoing process is initiated. This process proceeds to receive TDOs as they are offered by the service provider. In any case, TDOs are pre-delivered or delivered simultaneously with receipt of associated content by the television receiver device at 124. The TDOs can be delivered as user data forming a part of the DTV video stream or may be delivered by the television's Internet connection or using any other mechanism for delivery of the program. In one implementation, the service provider utilizes excess bandwidth to deliver the content using NRT services as defined by either a standards body such as the Advanced Television Systems Committee (ATSC), or by a particular service provider or using any other suitable proprietary mechanism.

It is noted that the downloading of TDOs is an ongoing process that occurs whenever TDO data are transmitted to the television. So, although it is depicted in this process as block 124, it is to be understood that this is not an ordered operation that occurs only between the blocks shown in this flow chart 100. Rather, it is an ongoing background operation that occurs as the data are presented by the source of the TDOs. It is further understood that the TDO is a program that runs on the target television receiver device and can perform any program function that can be devised to run on the television receiver device platform, within the scope of the available functionality offered by the standardized API defined for TDOs.

Once a TDO is delivered, assuming the TDO does not define itself as self triggering, it remains inactive and lies in wait until a trigger object is received. Triggers are awaited at 128. Since the triggers and TDOs are time-sensitive by association with a television program, advertisement or other event, it is the complete receipt of a trigger object at 128, as indicated by the "yes" at 132 and the meeting of any time constraints imposed by the trigger's data that establishes timing for the trigger to call for the TDO to perform or carry out its announcement routine. This can be accomplished by either receipt of the trigger determining the announcement time or the trigger object may contain a later announcement time or times. This announcement may be as simple as display of an icon for a prescribed period of time in a prescribed location of the TV screen or it may be a more complex announcement routine such as display of an animation on the screen and/or an audio announcement. This announcement is carried out at 136.

If the viewer elects to respond to this announcement and interact with the TDO, he or she may elect to do so at 140 by carrying out a user command (either a standard command or a command as instructed in the announcement) at 144. If the user elects not to interact with the TDO, the announcement will disappear after a prescribed time or the user may dismiss the announcement by action of the remote controller at 140 to return control to block 128 where the next trigger is awaited.

Once the user elects to interact with the TDO at 140 and 144, the TDO is launched by the combination of the user command and the presence of the TDO and trigger, provided all actions are taken prior to expiration of the TDO as prescribed in the trigger's data. The user may then interact with the TDO at 148 in whatever manner is appropriate to the particular TDO's functionality. Once the user is done with the TDO at 150, control returns to 128 where the process awaits receipt of the next trigger (for this or another TDO stored in memory). Note that as previously mentioned, during this entire operation other TDOs may be being received by the television receiver device (e.g., television or STB), initialized and stored.

Figure 3:
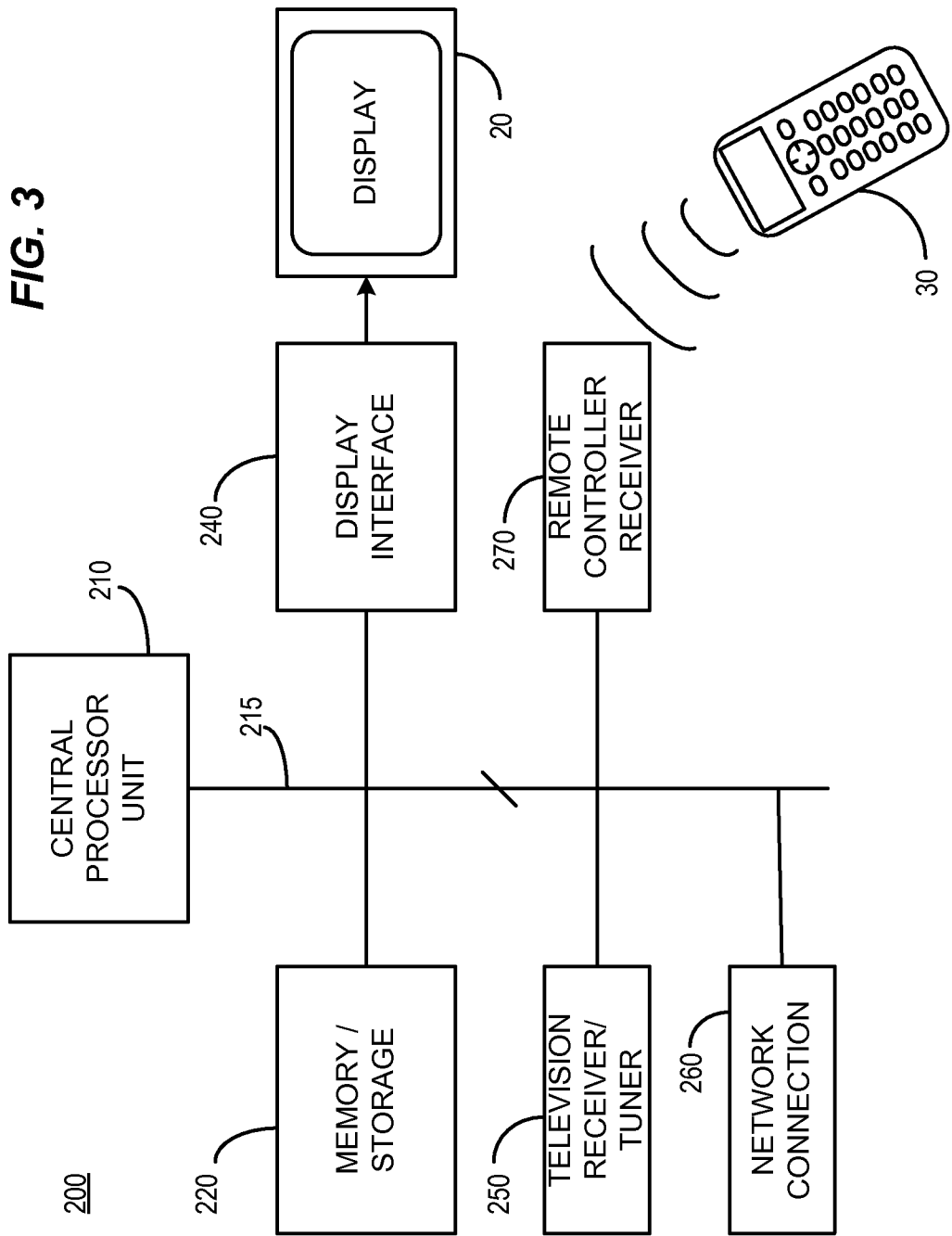
FIG. 3 is an example block diagram of a television receiver device that uses TDOs in a manner consistent with certain embodiments of the present invention.

Any of the above processes and variations thereof can be carried out on a television receiver device such as a television set or set top box using a programmed processor or hardware equivalent. One basic implementation is depicted in FIG. 3 as television receiver device 200. Device 200 has one or more central processor units (CPU) 210 with an associated bus 215 (or multiple buses) used to connect the central processor unit 210 to memory and storage represented as 220 in a known manner. As TDOs and triggers are received, they are stored to the memory and storage 220. A display interface 240 is provided to either supply an output for an external display or, in the case of a television set, to directly interface to an integral display 20. The television device 200 includes a television receiver/tuner 250 for receiving television signals including NRT data from an over the air broadcast or cable or satellite source. In some instances, television device 200 may also or alternatively include a network connection 260 for receiving television programming and NRT data including TDOs and triggers via the Internet, for example using Sony Corporation's Bravia™ Internet Video Link (BIVL™) which may be coupled to a local area network (LAN) and/or wide area network (WAN) and/or the Internet. In order to receive signals such as infrared (IR) or radio frequency (RF) remote controller signals, a remote controller receiver 270 is interfaced to the system so that the user can initiate commands to start the visual screening test and to carry out the test function using a keypad of the remote controller 30 as shown.

Thus, a method consistent with certain implementations involves pre-delivering a triggered declarative object (TDO) to a television receiver device that carries out a programmed routine when user activated; the TDO including an announcement definition that defines an announcement that announces presence of the TDO to the at the announcement time and an icon or animation that is used in the announcement and timing data that defines a time during which the TDO may be user activated and a screen location for display of at least a portion of an image in the TDO; initiating the TDO; delivering one or more trigger objects associated with the TDO to the television receiver device, the TDO including metadata that defines: an announcement time that defines at least one time at which an announcement of the TDO is to be made, a screen location for the announcement, and announcing the presence of the TDO when the announcement time is reached; receiving a signal from a user by activation of a remote controller command responsive to the announcement indicating that the user wishes to interact with the TDO; and responsive to the signal from the user, launching the TDO.

Another method involves pre-delivering a triggered declarative object (TDO) to a television receiver device that carries out a programmed routine when user activated and includes an announcement definition that announces presence of the TDO to the at the announcement time; delivering one or more trigger objects associated with the TDO to the television receiver device, the trigger object including data that defines an announcement time at which an announcement of the TDO is to be made.

In certain implementations, the time at which the announcement is to be made is upon receipt of the trigger object. In certain implementations, the trigger object further includes data that defines a display position for display of an announcement image. In certain implementations the method further involves receiving a signal from a user by activation of a remote controller command responsive to the announcement indicating that the user wishes to interact with the TDO; and responsive to the signal from the user, launching the TDO. In certain implementations, the TDO further defines an icon that is used in the announcement. In certain implementations, the TDO further defines an animation that is used in the announcement.

Another method involves pre-delivering a triggered declarative object (TDO) to a television receiver device that carries out a programmed routine when user activated and includes an announcement definition that announces presence of the TDO to the at the announcement time; and delivering one or more trigger objects associated with the TDO to the television receiver device, the trigger object including data that defines a location on a video display for display of the announcement of the TDO.

In certain implementations, the method further involves receiving a signal from a user by activation of a remote controller command responsive to the announcement indicating that the user wishes to interact with the TDO; and responsive to the signal from the user, launching the TDO. In certain implementations, the TDO further defines an icon that is used in the announcement. In certain implementations, the TDO further defines an animation that is used in the announcement.

Another method involves delivering a triggered declarative object (TDO) to a television receiver device that carries out a programmed routine when user activated and includes an announcement definition that announces presence of the TDO to the at the announcement time; and the TDO including data that defines a time of display of an announcement and a location on a video display for display of the announcement of the TDO.

In certain implementations, the method further involves receiving a signal from a user by activation of a remote controller command responsive to the announcement indicating that the user wishes to interact with the TDO; and responsive to the signal from the user, launching the TDO. In certain implementations, the TDO further defines an icon that is used in the announcement. In certain implementations, the TDO further defines an animation that is used in the announcement.

Any of the above methods can be carried out using a computer readable storage medium such as a non-transitory storage medium storing instructions which when executed on a programmed processor carry out the method.

Those skilled in the art will recognize, upon consideration of the above teachings, that certain of the above exemplary embodiments are based upon use of a programmed processor. However, the invention is not limited to such exemplary embodiments, since other embodiments could be implemented using hardware component equivalents such as special purpose hardware and/or dedicated processors. Similarly, general purpose computers, microprocessor based computers, micro-controllers, optical computers, analog computers, dedicated processors, application specific circuits and/or dedicated hard wired logic may be used to construct alternative equivalent embodiments.

Certain embodiments described herein, are or may be implemented using a programmed processor executing programming instructions that are broadly described above in flow chart form that can be stored on any suitable electronic or computer readable storage medium. However, those skilled in the art will appreciate, upon consideration of the present teaching, that the processes described above can be implemented in any number of variations and in many suitable programming languages without departing from embodiments of the present invention. For example, the order of certain operations carried out can often be varied, additional operations can be added or operations can be deleted without departing from certain embodiments of the invention. Error trapping can be added and/or enhanced and variations can be made in user interface and information presentation without departing from certain embodiments of the present invention. Such variations are contemplated and considered equivalent.

While certain illustrative embodiments have been described, it is evident that many alternatives, modifications, permutations and variations will become apparent to those skilled in the art in light of the foregoing description.

What is claimed is:

1. A method, comprising:
pre-delivering a triggered declarative object (TDO) to a television receiver device, the TDO including a programmed routine script that is executed when user activated;
the TDO including
an announcement definition that defines an announcement that announces to the user, presence of the TDO at an announcement time,
an icon or animation that is used in the announcement and
timing data that defines a time during which the TDO is user activatable and a screen location for display of at least a portion of an image in the TDO;
delivering one or more trigger objects associated with the TDO to the television receiver device, the trigger objects including metadata that defines:
the announcement time that defines at least one time at which the announcement of the TDO is to be made, and
a screen location for the announcement;
announcing the presence of the TDO to the user when both the announcement time is reached and the TDO remains user activatable according to the timing data;
receiving a signal from a user by activation of a remote controller command responsive to the announcement indicating that the user wishes to interact with the TDO; and
responsive to the signal from the user, launching the TDO.

2. A non-transitory computer readable storage medium storing instructions which, when executed on one or more programmed processors, carry out a method according to claim 1.

3. The method according to claim 1, wherein the announcement at the announcement time is presented to the user before the TDO is executable by user activation.

4. A method, comprising:
pre-delivering a triggered declarative object (TDO) to a television receiver device, the TDO including a programmed routine script that is executed when user activated and includes an announcement definition that announces, to the user, presence of the TDO at an announcement time; and
delivering one or more trigger objects associated with the TDO to the television receiver device, one of the one or more trigger objects including data that defines the announcement time at which an announcement of the TDO is to be made to the user,
wherein the announcement at the announcement time is presented to the user before the TDO is executable by user activation.

5. The method according to claim 4, wherein the time at which the announcement is to be made is upon receipt of the one of the one or more trigger objects.

6. The method according to claim 4, wherein the one or more of the trigger objects further includes data that defines a display position for display of an announcement image.

7. The method according to claim 4, further comprising:
receiving a signal from a user by activation of a remote controller command responsive to the announcement indicating that the user wishes to interact with the TDO; and
responsive to the signal from the user, launching the TDO.

8. The method according to claim 4, wherein the TDO further defines an icon that is used in the announcement.

9. The method according to claim 4, wherein the TDO further defines an animation that is used in the announcement.

10. A non-transitory computer readable storage medium storing instructions which, when executed on one or more programmed processors, carry out a method according to claim 4.

11. A method, comprising:
pre-delivering a triggered declarative object (TDO) to a television receiver device, the TDO including a programmed routine script that is executed when user activated and includes an announcement definition that announces, to the user, presence of the TDO at an announcement time; and
delivering one or more trigger objects associated with the TDO to the television receiver device, one of the one or more trigger objects including data that defines a location on a video display for display of an announcement of the TDO to the user, wherein the announcement at the announcement time is presented to the user before the TDO is executable by user activation.

12. The method according to claim 11, further comprising:
receiving a signal from a user by activation of a remote controller command responsive to the announcement indicating that the user wishes to interact with the TDO; and
responsive to the signal from the user, launching the TDO.

13. The method according to claim 11, wherein the TDO further defines an icon that is used in the announcement.

14. The method according to claim 11, wherein the TDO further defines an animation that is used in the announcement.

15. A non-transitory computer readable storage medium storing instructions which, when executed on one or more programmed processors, carry out a method according to claim 11.

16. A method, comprising:
delivering a triggered declarative object (TDO) to a television receiver device, the TDO including a programmed routine script that is executed when user activated and includes an announcement definition that announces to the user, presence of the TDO at an announcement time; and
the TDO including data that defines the time of display of an announcement and a location on a video display for display of the announcement of the TDO to the user,
wherein the announcement at the announcement time is presented to the user before the TDO is executable by user activation.

17. The method according to claim 16, further comprising:
receiving a signal from a user by activation of a remote controller command responsive to the announcement indicating that the user wishes to interact with the TDO; and
responsive to the signal from the user, launching the TDO.

18. The method according to claim 16, wherein the TDO further defines an icon that is used in the announcement.

19. The method according to claim 16, wherein the TDO further defines an animation that is used in the announcement.

20. A non-transitory computer readable storage medium storing instructions which, when executed on one or more programmed processors, carry out a method according to claim 18.

* * * * *